(12) United States Patent
Bober et al.

(10) Patent No.: US 9,307,883 B2
(45) Date of Patent: Apr. 12, 2016

(54) DOUBLE-SIDED MOP

(71) Applicant: Diversey, Inc., Sturtevant, WI (US)

(72) Inventors: Andrew M. Bober, Racine, WI (US); Alfred A. Widmer, Wilen b. Wil (CH); Thomas Tement, Bronschhofen (CH); Pedro Manuel Esteves Lopes, Walzenhausen (CH); Mehmet Avci, Bronschhofen (CH)

(73) Assignee: Diversey, Inc., Sturtevant, WI (US)

( * ) Notice: Subject to any disclaimer, the term of this patent is extended or adjusted under 35 U.S.C. 154(b) by 84 days.

(21) Appl. No.: 14/154,683

(22) Filed: Jan. 14, 2014

(65) Prior Publication Data

US 2014/0259494 A1 Sep. 18, 2014

Related U.S. Application Data

(60) Provisional application No. 61/788,356, filed on Mar. 15, 2013, provisional application No. 61/904,840, filed on Nov. 15, 2013.

(51) Int. Cl.
*A47L 13/20* (2006.01)
*A47L 13/16* (2006.01)
*B32B 5/02* (2006.01)
(Continued)

(52) U.S. Cl.
CPC ............... *A47L 13/20* (2013.01); *A47L 13/16* (2013.01); *B32B 3/04* (2013.01); *B32B 5/022* (2013.01); *B32B 5/026* (2013.01); *A47L 13/254* (2013.01); *A47L 13/258* (2013.01); *B32B 2262/0253* (2013.01); *B32B 2262/0276* (2013.01); *B32B 2307/726* (2013.01); *B32B 2432/00* (2013.01)

(58) Field of Classification Search
CPC ......... A47L 13/00; A47L 13/10; A47L 13/12; A47L 13/16; A47L 13/17; A47L 13/20; A47L 13/22; A47L 13/24; A47L 13/254; A47L 13/256; A47L 13/257; A47L 13/258
USPC .............. 15/104.93, 104.94, 118, 208, 209.1, 15/210.1, 220.1, 147.1, 147.2, 15/244.1–244.4, 228
See application file for complete search history.

(56) References Cited

U.S. PATENT DOCUMENTS 1,849,286 A * 3/1932 Evans ............................. 15/228
2,395,094 A * 2/1946 Booharin ..................... 15/244.4
(Continued)

FOREIGN PATENT DOCUMENTS

FR 2840523 12/2003
FR 2915075 10/2008
(Continued)

OTHER PUBLICATIONS

International Search Report from the International Searching Authority for Application No. PCT/US2014/011436 dated Jul. 24, 2014 (8 pages).

(Continued)

*Primary Examiner* — Mark Spisich
(74) *Attorney, Agent, or Firm* — Michael Best & Friedrich LLP (57) ABSTRACT

A mop includes a first section having a first side, a second section having a second side, and an embedded, semi-permeable layer disposed between the first and second sections to manage an amount of liquid flowing from the first side to the second side.

17 Claims, 12 Drawing Sheets

(51) Int. Cl.
*B32B 3/04* (2006.01)
*A47L 13/254* (2006.01)
*A47L 13/258* (2006.01)

(56) References Cited

U.S. PATENT DOCUMENTS

| | | | |
|---|---|---|---|
| 2,796,617 A * | 6/1957 | Bradshaw | 15/1 |
| 2,835,911 A * | 5/1958 | Mahmarian | 401/186 |
| 2,880,443 A * | 4/1959 | Le Febvre | 15/244.1 |
| 3,556,918 A * | 1/1971 | Lemelson | 428/109 |
| 4,510,641 A * | 4/1985 | Morris | 15/118 |
| 5,094,559 A | 3/1992 | Rivera et al. | |
| 5,525,397 A * | 6/1996 | Shizuno et al. | 428/138 |
| 5,893,191 A | 4/1999 | Schneider et al. | |
| 6,681,434 B2 | 1/2004 | Smith | |
| 7,350,257 B2 | 4/2008 | McKay | |
| 7,487,567 B2 | 2/2009 | Kresse et al. | |
| 7,624,468 B2 | 12/2009 | Reddy et al. | |
| 8,245,351 B2 | 8/2012 | Rosenzweig et al. | |
| 2003/0104750 A1 | 6/2003 | Kelly | |
| 2004/0074520 A1 | 4/2004 | Truong et al. | |
| 2006/0214323 A1 | 9/2006 | Chappas, Jr. et al. | |
| 2008/0166176 A1 | 7/2008 | Rees et al. | |
| 2011/0023251 A1 * | 2/2011 | Bober et al. | 15/228 |
| 2011/0223375 A1 | 9/2011 | Kaminer et al. | |

FOREIGN PATENT DOCUMENTS

| | | | |
|---|---|---|---|
| JP | 3-152255 | * | 6/1991 |
| JP | H05-192285 | | 8/1993 |
| WO | 01/22858 | | 4/2001 |
| WO | 0122858 | | 4/2001 |
| WO | 2007/080553 | | 7/2007 |
| WO | 2009/072025 | | 6/2009 |

OTHER PUBLICATIONS

Written Opinion from the International Searching Authority for Application No. PCT/US2014/011436 dated Jul. 24, 2014 (9 pages).
PCT/US2014/011436 Invitation to Pay Additional Fees and, Where Applicable, Protest fees and Partial International Search Report dated Apr. 23, 2014 (7 pages).

* cited by examiner

DOUBLE-SIDED MOP

CROSS-REFERENCE TO RELATED APPLICATION

This application claims the benefit of and priority to U.S. Provisional Patent Application No. 61/788,356, filed Mar. 15, 2013, and to U.S. Provisional Patent Application No. 61/904, 840, filed Nov. 15, 2013, the entire contents of each of which are hereby incorporated by reference.

FIELD OF THE INVENTION

The present invention relates to mops, and more particularly, to a double-sided mop.

BACKGROUND

A wide variety of floor tools exist for many applications, including for cleaning floor surfaces, polishing floor surfaces, applying material to floor surfaces, stripping material from floor surfaces, and other applications. Traditional single-sided or double-sided flat mop floor tools use either pockets, tabs, or hook and loop fastener material to attach the mop to the mop head. Also, some existing floor tools have articulated tool heads to enable head movement in one or more degrees of freedom, such as about a longitudinal axis and/or a lateral axis of the tool head. Despite the wide variety of existing floor tools, however, there exists a notable lack of floor tools capable of use over relatively large surface areas while being easy to use and providing a high degree of performance for extended life, particularly in cases where the floor tools are adapted for being moistened or for carrying a quantity of liquid.

SUMMARY

In one construction, the invention provides a mop having a first section having a first exterior side engageable with a surface, a second section on a reverse side of the mop and having a second exterior side engageable with the surface, and an embedded semi-permeable layer disposed between the first and second sections to limit permeability of liquid flowing from the first side to the second side.

In another construction, the invention provides a mop having a plurality of layers including an embedded, semi-permeable layer that limits liquid transfer from a first side of the mop to a second side of the mop for controlled wetting of sides of the mop, wherein the embedded semi-permeable layer is substantially non-absorbent.

In another construction, the invention provides a mop having a handle, and a tool head coupled the handle, the tool head including an engagement panel disposed along a bottom of the tool head, the engagement panel including engagement members and movable between a first position and a second position. The mop also includes a tool release mechanism operably coupled to the engagement panel to move the engagement panel between the first position and the second position, and a mop releasably coupled to the tool head via the engagement members, the mop including an embedded semi-permeable layer that divides the mop into two sections to limit an amount of liquid flowing from a first side of the mop to a second side of the mop.

Other aspects of the invention will become apparent by consideration of the detailed description and accompanying drawings.

Before constructions of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

Figure 1:
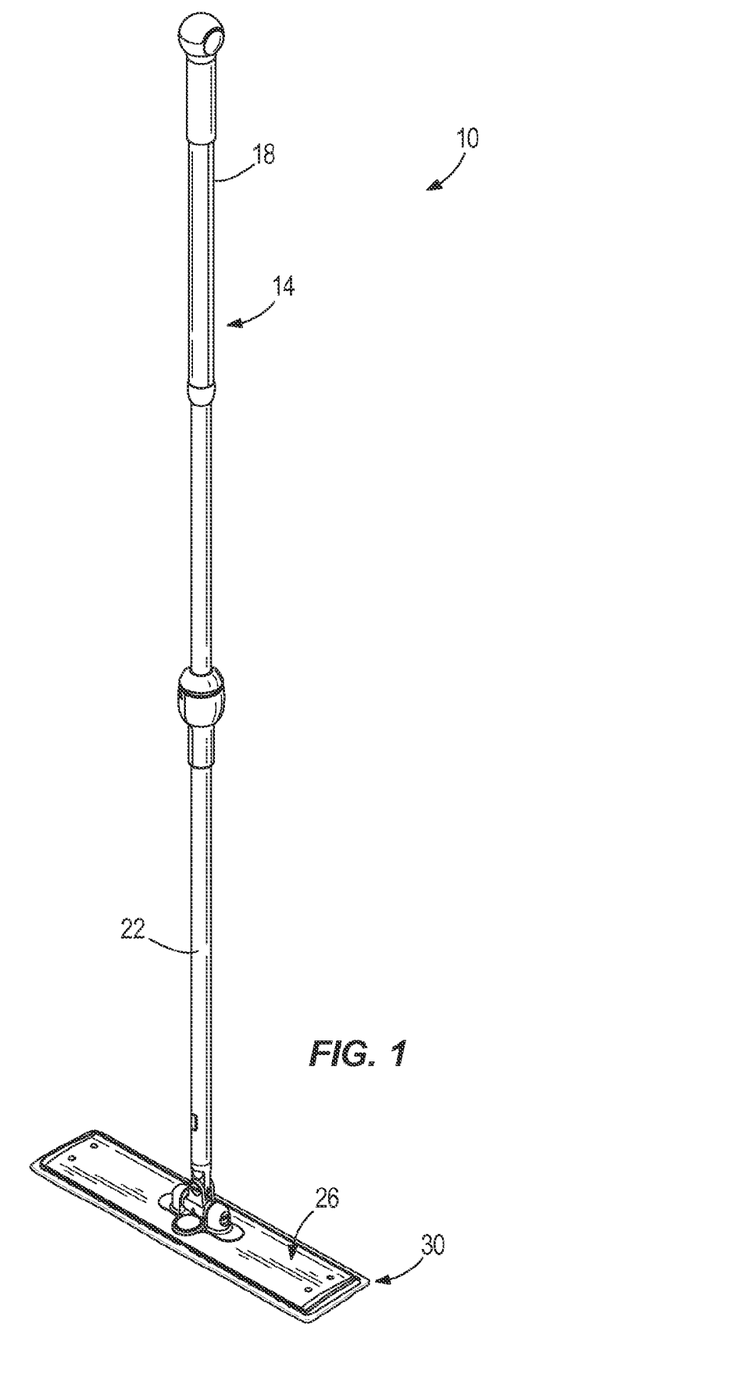
FIG. 1 is a perspective view of a maintenance tool including a handle, a tool head, and a mop embodying aspects of the present invention.

FIG. 1 illustrates a maintenance tool 10 that can be used on a floor or other surface, such as to clean, spread liquid upon, remove liquid from, polish, or perform other tasks on a floor or other surface (e.g., stairs, walls, ceilings, windows, etc.). As used herein, the term "floor" is intended to include any surface upon which any of these tasks can be performed, and/or to surfaces to which the tool 10 can be used to apply a liquid (e.g., wax, polish, cleaning product). The tool 10 includes a handle 14 that has a first or proximal end 18 and a second or distal end 22 attached to a tool head 26. A mop 30 is attached to the underside of the tool head 26.

Figure 2:
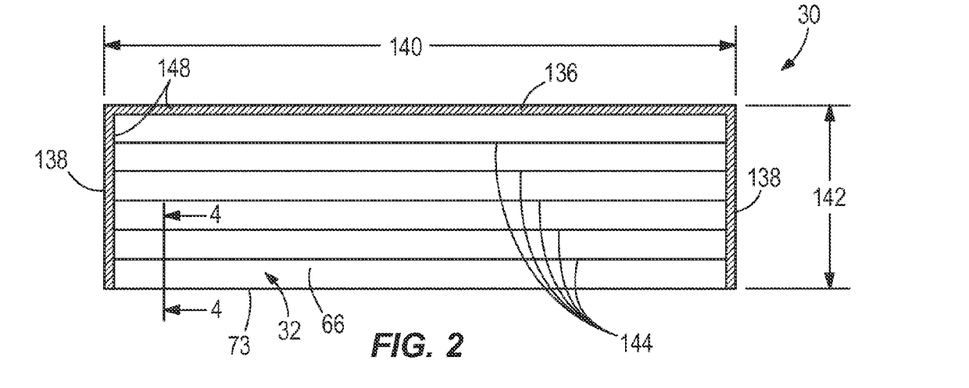
FIG. 2 is top plan view of the mop of FIG. 1.
Figure 3:
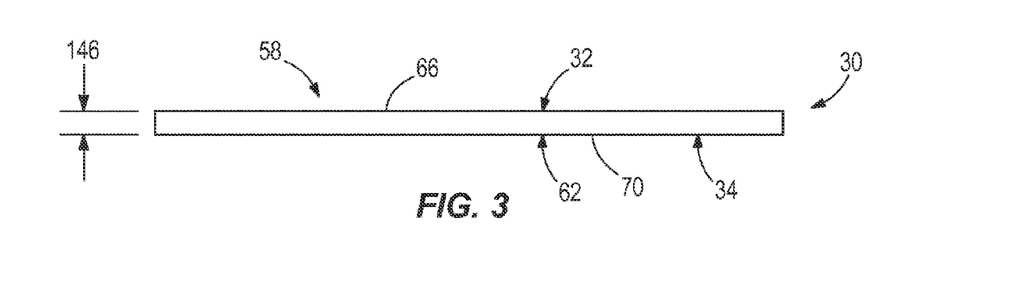
FIG. 3 is front view of the mop of FIG. 1.
Figure 4:
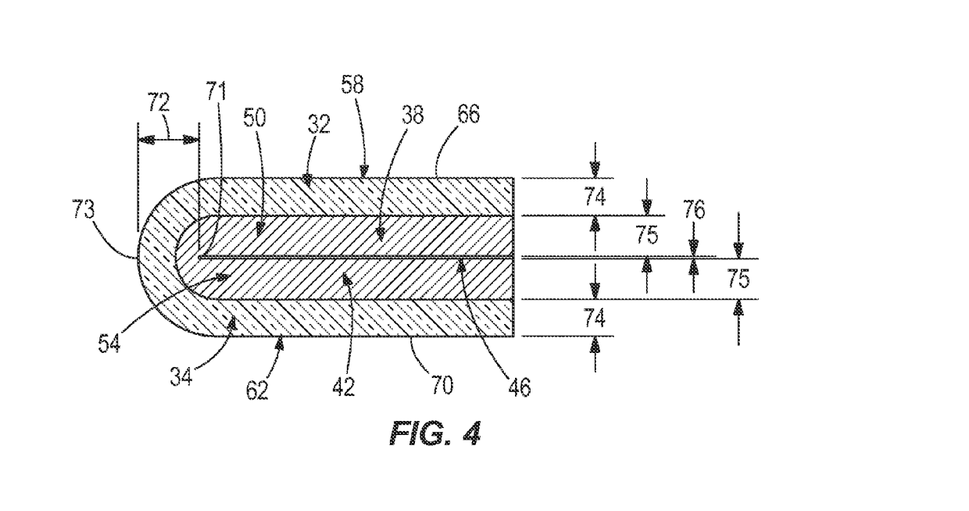
FIG. 4 is an enlarged, partial cross-sectional view of the mop taken along lines 4-4 of in FIG. 2, illustrating layers inside the mop including an embedded, semi-permeable layer.

With reference to FIGS. 2-4, the mop 30 includes a top layer 32, a bottom layer 34 opposite the top layer 32, a first middle layer 38, a second middle layer 42, and a semi-permeable layer 46 disposed between the first and second middle layers 38, 42. The layer 46 is an embedded layer that divides the mop 30 into two sections 50, 54 to manage an amount of liquid flowing from a first side 58 of the mop to a second side 62 of the mop 30. The layer 46 allows at least some fluid flow from one side of the layer 46 to the other, through the layer 46. The layer 46 acts as a barrier layer, to control an amount of fluid flow between the middle layers 38, 42. The first section 50 includes the top layer 32 and the first middle layer 38, and the second section 54 includes the second middle layer 42 and the bottom layer 34. The first side 58 includes an outer surface 66 of the top layer 32, and the second side 62 includes an outer surface 70 of the bottom layer 34. As illustrated in FIGS. 1-4, by way of example only, the mop 30 is a pad attachable to the tool 10 to clean and mop a surface (e.g. floor).

The top and bottom layers 32, 34 are surface-engaging layers made of material suitable for the intended functions of the mop. For example, the top and bottom layers 32, 34 can be made of microfiber cloth material, a polymer (e.g., expanded polypropylene or other synthetic resin-based material), cotton, terry cloth, wool, foam, and the like. In the illustrated construction, the top layer 32 and bottom layer 34 are each made of loops of warp knit NP160/72 DTY and polyester 150/48 DTY. The loops of the NP160/72 have at least the same length as the loops of the polyester 150/48 DTY. This arrangement of materials in the top and bottom layers 32, 34 facilitates low friction, thereby allowing the mop 30 to slide easily along a floor surface.

In the illustrated construction, and as illustrated in FIG. 4, the top and bottom layers 32, 34 form a single layer of material that wraps at least partially around the middle layers 38, 42. The middle layers 38, 42 form a single layer of material that wraps at least partially around an end 71 of the layer 46. A distance 72 between the end 71 and a front edge 73 of the mop 30 is approximately 7 mm, although other constructions include different values and ranges.

The middle layers 38, 42 can function as reservoirs for receiving, retaining, and discharging liquid received by the mop 30. In this regard, the middle layers 38, 42 can be made of any of the materials just described in connection with the top and bottom layers 32, 34. In the illustrated construction, the first and second middle layers 38, 42 are each made of circular knit NP160/72 DTY and polyester 150/72 DTY.

In some constructions the top and bottom layers 32, 34 are made from the same material, and as described above are made of a single piece of material wrapped to opposite sides of the mop 30. In some constructions, the top and bottom layers 32, 34 can be made of different materials, such as to perform different tasks on a surface, or using different pieces of material. In other constructions, the middle layers 38, 42 can be made from the same material. In still other constructions, the middle layers 38, 42 can be made from different materials (e.g., one middle layer 38, 42 having greater porosity, density, and/or capacity for absorbing liquid than the other 42, 38).

With reference to FIG. 4, the illustrated layer 46 is a mesh layer made of warp knit polyester 150/48 FY and polyester 75/36 FY. In some constructions, the layer 46 can be made of a perforated plastic sheet, a latex coated mesh, a plastic canvas, or another similar material, or of polyethylene (PE) or polypropylene (PP) non-woven material.

As illustrated in FIG. 4, the top and bottom layers 32, 34 each have a thickness 74 of approximately 4.5 mm, although other constructions include different values and ranges. The middle layers 38, 42 each have a thickness 75 of approximately 5 mm, although other constructions include different values and ranges. The layer 46 has a thickness 76 of approximately 0.5 mm, although other constructions include different values and ranges. For example, in some constructions the layer 46 has a thickness 76 of between approximately 0.5 mm and 0.7 mm.

The mop 30 can use different materials for the layer 46, the top layer 32, the bottom layer 34, and the middle layers 38, 42. Also, the mop 30 can include more or fewer middle layers than what is illustrated in the FIGS. 2-4. For example, the mop 30 can be provided with the top layer 32, the bottom layer 34, and the layer 46 without middle layers. Also, while the illustrated mop 30 is symmetrical about the layer 46, the mop 30 may not be symmetrical (e.g., by having only one of the middle layers 38, 42, by having a middle layer 38 or 42 that is thicker than the other middle layer 42 or 38, respectively, by having a top layer 32 that is thicker or thinner than the bottom layer 34, any combination thereof, or other non-symmetrical features).

Figure 5:
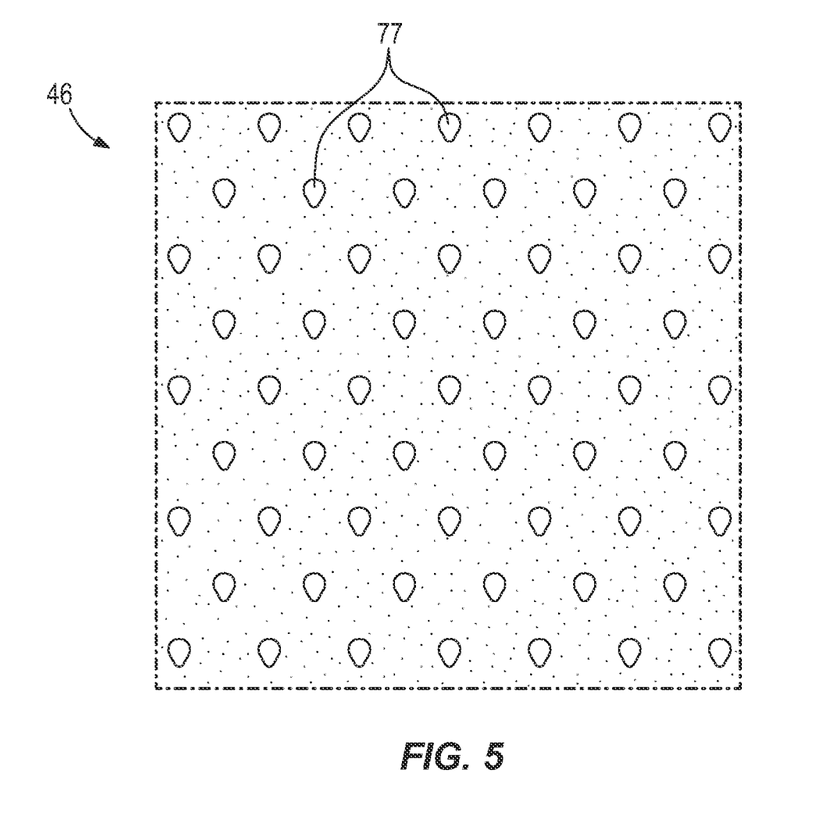
FIG. 5 is a top plan view of a portion of the semi-permeable layer.
Figure 6:
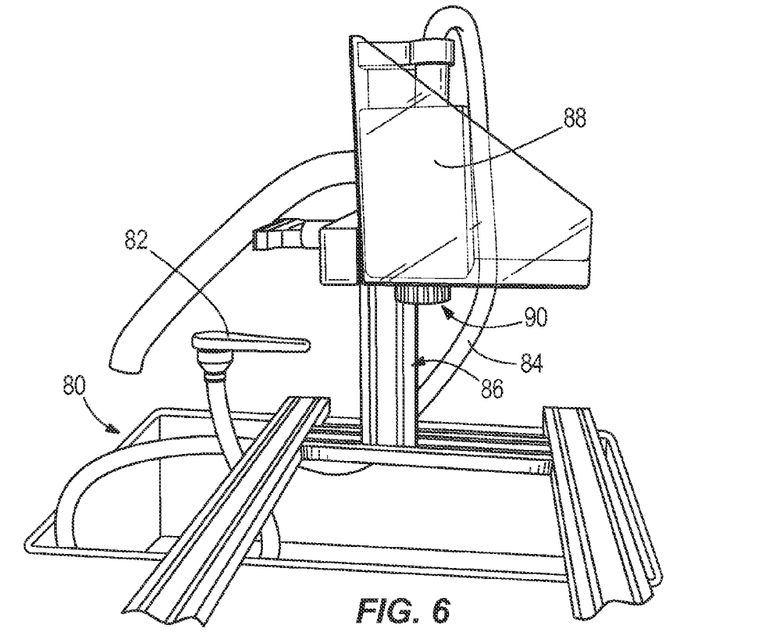
FIG. 6 is a top perspective view of a testing set-up for testing the permeability of the semi-permeability layer.
Figure 7:
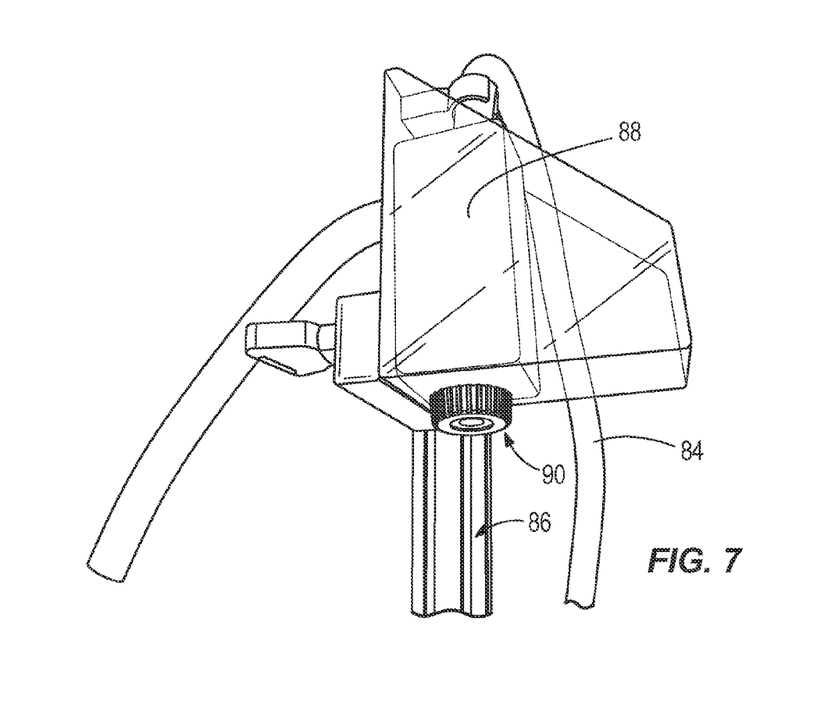
FIG. 7 is a bottom perspective view of the testing set-up.

With reference to FIG. 5, the layer 46 has a plurality of holes 77 spaced generally evenly along the layer 46. The holes 77 extend through the layer 46, and provide pathways for water movement through the layer 46. In the illustrated construction, the layer 46 has approximately 56 holes/cm$^2$. Each of the illustrated holes 77 has a diameter between approximately 0.6 mm and 0.75 mm. In some constructions, the number of holes per square centimeter and/or the hole size can vary. For example, the layer 46 may include a finer mesh (e.g., with holes 77 that are smaller than 0.6 mm in diameter) that has a thickness 76 that is less than 0.5 mm. Other constructions of the layer 46 can utilize a more open mesh (i.e., with holes 77 that are larger than 0.75 mm) that has a thickness 76 greater than 0.7 mm. Various combinations of hole size and layer thickness are possible.

With continued reference to FIGS. 1-5, the layer 46 has sufficient porosity and relatively small thickness to allow bulk liquid to pass between the sections 50, 54 without the material of the middle layer 38 contacting the material of the middle layer 42. Contact of material between the middle layers 38, 42 can adversely create a direct wicking effect through the layer 46, which would allow for a more continuous transfer of liquid across the layer 46. In order to prevent this wicking, the layer 46 has a suitable porosity and thickness that physically separates the middle layers 38, 42 and the two sections 50, 54 while also permitting passage of liquid.

With continued reference to FIGS. 1-5, the layer 46 permits liquid transfer from the first section 50 to the second section 54 to wet both sections 50, 54 of the mop 30 for use. Thus, when one side of the mop 30 is wetted with liquid, the opposite side may also become wetted. In some constructions the layer 46 permits both sections 50, 54 of the mop to be wetted generally equally. The layer 46 does not accumulate moisture or liquid. Rather, as described above, the layer 46 acts as a gateway and permits a controlled liquid flow across the layer 46. The layer 46 is porous enough to allow bulk liquid flow across the layer 46 in order to wet both sections 50, 54, but not so porous that liquid from one section 50, 54 moves too quickly to the other section 50, 54, leaving one of the sections 50, 54 dry before a user is finished using the mop 30.

The amount of liquid flow and the rate of liquid flow across the layer 46 are based upon a selected permeability of the layer 46. An exemplary test apparatus and process for evaluating the permeability of the layer 46, and to determine a desired permeability, is described in detail below with reference to FIGS. 6-16. The exemplary test apparatus and process subjects a sample of the layer 46 (e.g., an approximately 1 cm×1 cm square portion of the material comprising the layer 46) to water passing through the layer 46 over time to determine a flow rate (in liters/minute) of water passing through the layer 46.

Figure 8:
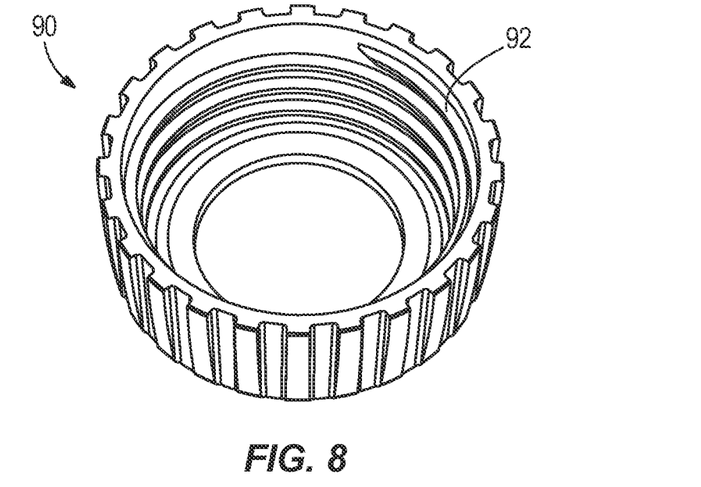
FIG. 8 is a top perspective view of a cap used in the testing set-up.
Figure 9:
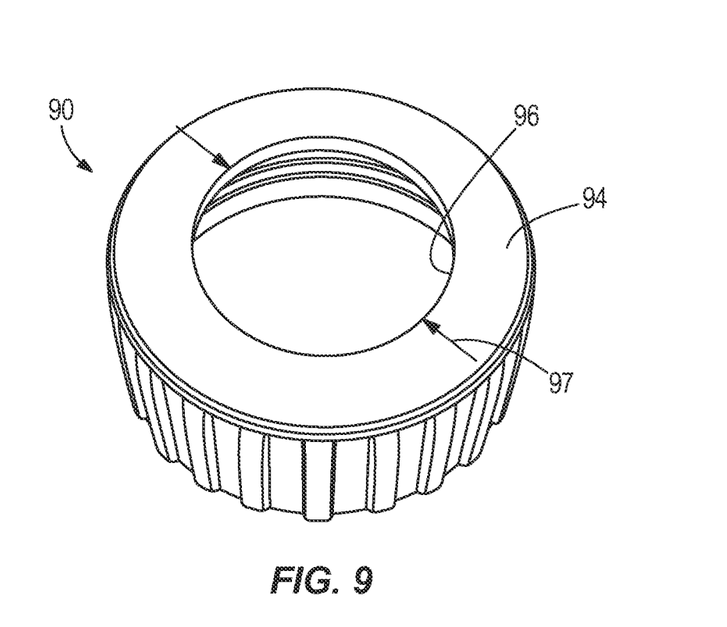
FIG. 9 is a bottom perspective view of the cap.

With reference to FIGS. 6-9, the permeability of the layer 46 can be tested by attaching a washbasin 80 with a functional water tap 82 to a flexible tube 84. The flexible tube 84 is coupled to a test stand 86. In particular, an end of the flexible tube 84 is directed into an upper opening of a plastic container 88 that is coupled to a cap 90. As illustrated in FIGS. 8 and 9, the cap 90 has a top side 92 for coupling to the container 88, and a bottom side 94. A circular opening 96 passes through the bottom side 94 having a diameter 97.

Figure 10:
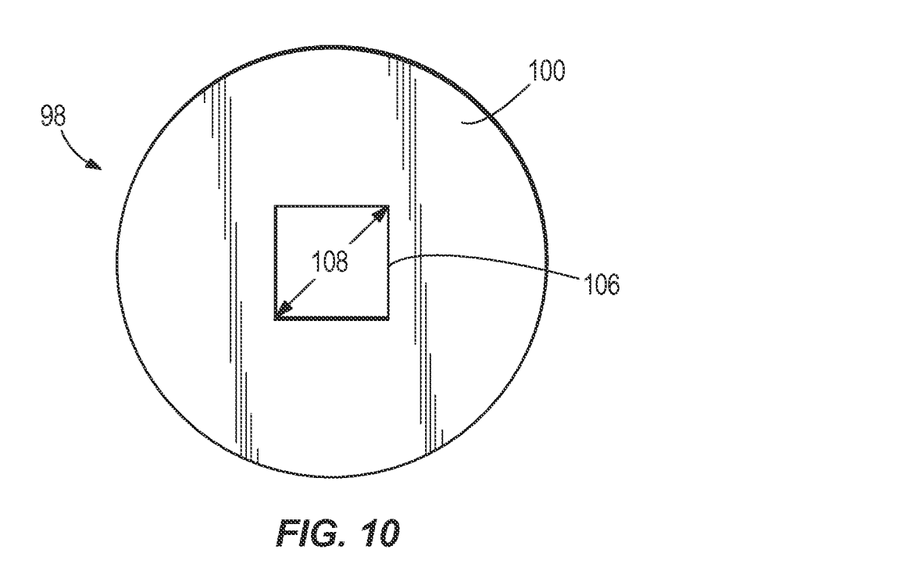
FIG. 10 is a top plan view of a first circular metal disk used in the testing set-up.
Figure 11:
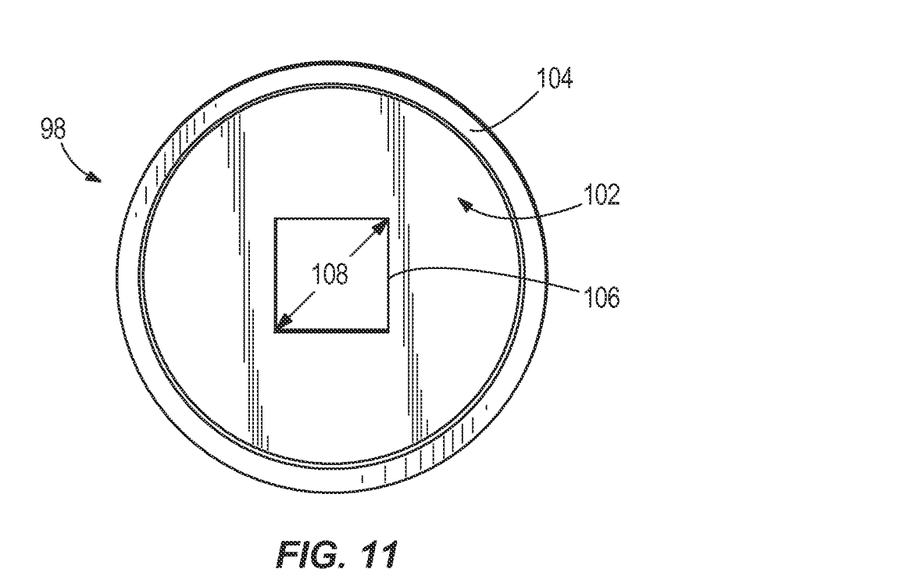
FIG. 11 is a bottom plan view of the first disk.
Figure 12:
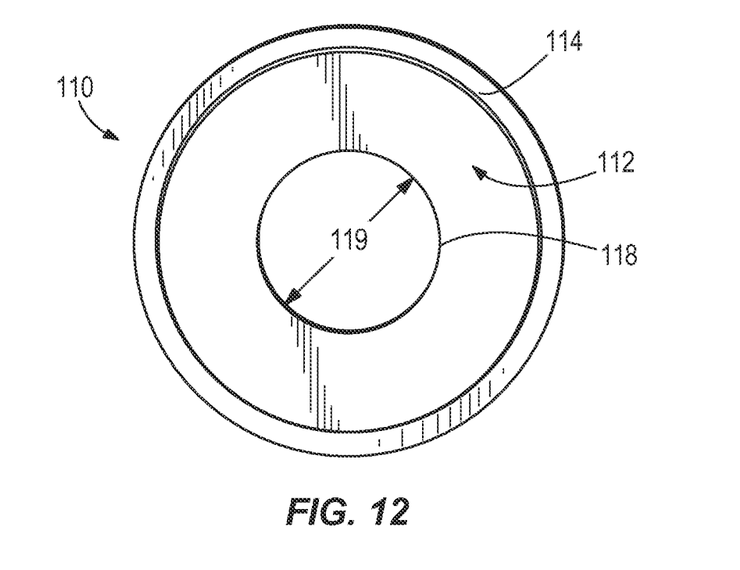
FIG. 12 is a top plan view of a second circular metal disk used in the testing set-up.
Figure 13:
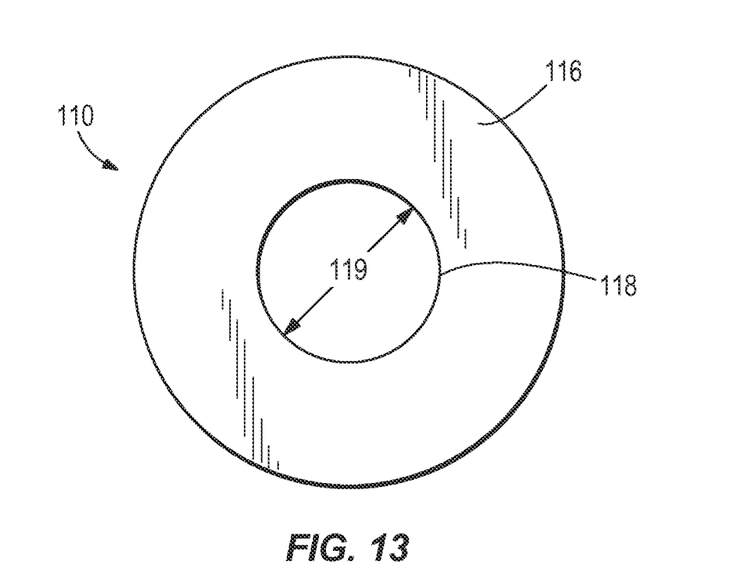
FIG. 13 is a bottom plan view of the second disk.
Figure 14A:
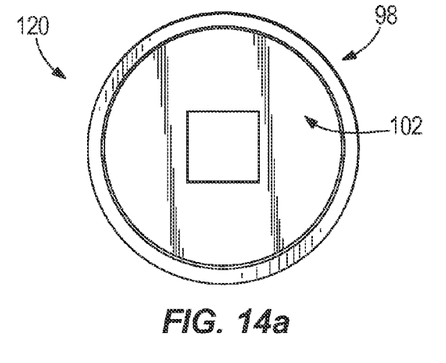
FIGS. 14a-e illustrate assembly of the cap, metal disks, and a sample of the semi-permeable layer.
Figure 14B:
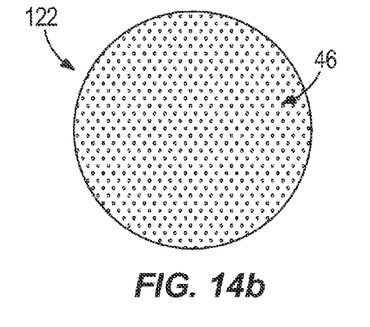
Figure 14C:
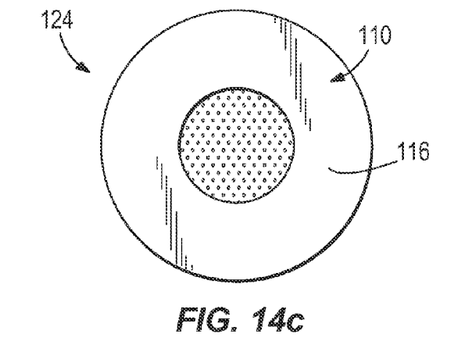
Figure 14D:
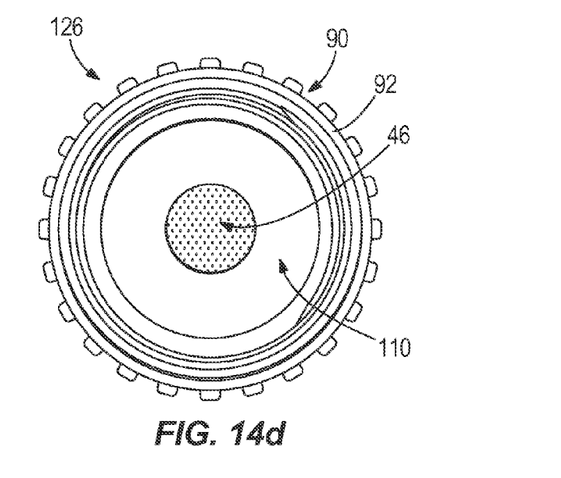
Figure 14E:
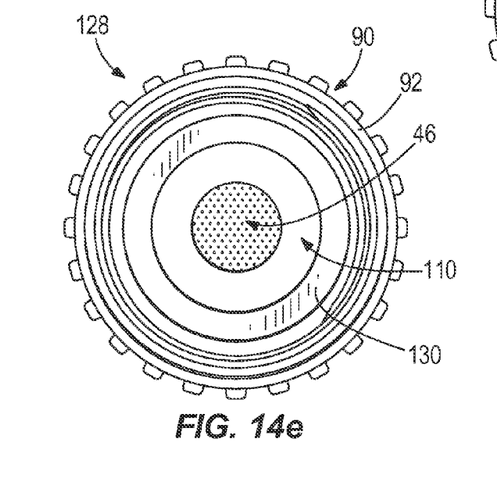
Figure 15:
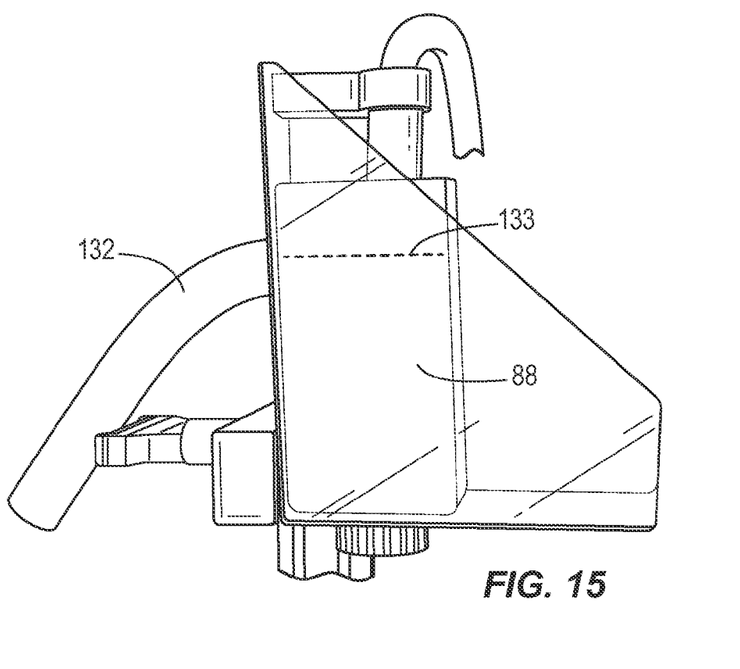
FIG. 15 is a perspective view of the testing set-up, illustrating a step of water adjustment.
Figure 16:
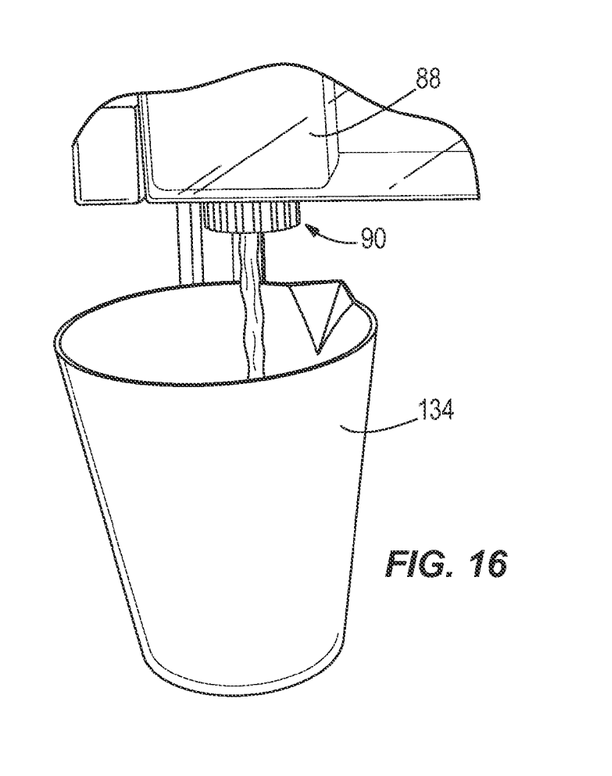
FIG. 16 is a perspective view of the testing set-up, illustrating water passing through the sample of the semi-permeable layer.

FIGS. 10, 11, and 14 illustrate that the cap 90 is generally sized and configured to receive a first circular disk 98 that has a top side 100, a bottom side 102 with a circumferential outer ridge 104, and a square opening 106 (e.g., 1 cm×1 cm) passing through a center of the disk 98. The square opening 106 has a diagonal distance 108 between diagonally opposite corners. With reference to FIGS. 12-14, the cap 90 also is sized and configured to receive a second circular disk 110 that has a top side 112 with a circumferential outer ridge 114, a bottom side 116, and a circular opening 118 passing through a center of the disk 110. The illustrated circular opening 118 has a diameter 119 that is greater than the diagonal distance 108.

FIGS. 14a-e illustrate assembly steps for the cap 90, the first circular disk 98, the second circular disk 110, and the sample of the layer 46 for use in the testing apparatus. With reference to FIG. 14, the first circular disk 98 is placed on a table or other surface with the bottom side 102 facing up at step 120. At step 122, a circular piece of the layer 46 (e.g., having an outer diameter approximately equal to an outer diameter of the first circular disk 98) is placed onto the bottom side 102 of the circular disk 98. At step 124, the top side 112 of the second circular disk 110 is then placed on top of the combined first circular disk 110 and the layer 46 with the bottom side 116 exposed (i.e. facing upward). At step 126, the combined layer 46, first circular disk 98, and second circular disk 110 are then placed into the cap 90 through the top side 92. At step 128, a seal 130 is positioned on the bottom side 116 of the first circular disk 98 to minimize or inhibit leakage through the assembly.

After assembly, the combined layer 46, cap 90, first circular disk 98, second circular disk 110, and seal 130 are coupled to the container 88 so that an approximately 1 cm×1 cm portion of the layer 46 is exposed through the square opening 106 to test the permeability of the layer 46. With reference to FIGS. 6, 7, 15 and 16, the test is conducted, for example, by directing water from the water tap 82 and the flexible tube 84 into the container 88. A second flexible tube 132 extending out of the container 88 can direct excess water out of the container 88 back to the washbasin 80. During testing, water flows out of the container 88 through the cap 90, and the water pressure from the water tap 82 is adjusted until the water level in the container 88 remains substantially the same at approximately 1.0 liter (see reference line 133 in FIG. 15). With the water level maintained at approximately 1.0 liter inside the container 88, an empty pitcher 134 is placed underneath the cap 90. The pitcher 134 is held in place for one minute to allow water flow into the pitcher 134. After one minute, the accumulated water inside the pitcher 134 is weighed and a flow rate is calculated for the layer 46 based on the weight of the water. In actual testing, this process was repeated six times on a first sample layer 46, producing an average flow rate of approximately 1.558 liters/minute.

A second sample layer 46 also was tested, but unlike the first sample layer 46, the second sample layer 46 was subjected to ten wash cycles prior to testing the layer 46 as described in the previous paragraph. The wash cycles conform to a pre-established, standardized mop test protocol for evaluating mop material. Each wash cycle (e.g., with a total wash cycle time of 54.75 minutes), for purposes of description, includes heating wash water to between approximately 90-95 degrees Celsius, and then the following steps:

1) A warm, high fill (5 minutes);
2) a pre-flush (3 minutes);
3) fluid drain (1 minute);
4) a hot-low fill (5 minutes);
5) delivery of detergent (45 seconds);
6) a wash (7 minutes);
7) fluid drain (1 minute);
8) a hot-high fill (5 minutes);
9) a rinse (3 minutes);
10) fluid drain (1 minute);
11) a medium speed extract (1 minute);
12) a delay (30 seconds);
13) a warm-high fill (5 minutes);
14) a rinse (2 minutes);
15) a drain (1 minute);
16) a cold-high fill (5 minutes);
17) a rinse (2 minutes);
18) a drain (1 minute);
19) a high speed extract (5 minutes); and
20) a delay (30 seconds).

After repeating the test procedure six times, this other layer 46 had an average flow rate of approximately 1.824 liters/minute. A third sample layer 46 subjected to 100 wash cycles according to the cycle described above was also tested six times, which produced an average flow rate of approximately 1.947 liters/minute. A fourth sample layer 46 was subjected to 200 wash cycles and then tested, which produced an average flow rate of approximately 2.204 liters/minute. A fifth sample layer 46 subjected to 300 wash cycles was also tested six times, which produced an average flow rate of approximately 2.076 liters/minute. A sixth sample layer 46 subjected to 400 wash cycles was also tested six times, which produced an average flow rate of approximately 2.277 liters/minute. A seventh sample layer 46 subjected to 500 wash cycles was also tested six times, which produced an average flow rate of approximately 2.176 liters/minute. Four other types of layers of perforated material, other than the mesh layer 46 illustrated in FIGS. 1-5, also were tested using the testing procedure described above. The testing produced respective flow rates 0.735 liters/minute, 5.472 liters/minute, 5.540 liters/minute, and 0.012 liters/minute. Based on testing, the layer 46 described and illustrated with regard to FIGS. 1-5 provided the most desirable flow rate range so that the layer 46 has a porosity sufficient to allow for bulk liquid flow across the layer 46, while having the holes 77 sized to permit 1 liter of water flow in a timeframe range of approximately 35-40.

With this porosity and flow rate, the two sections 50, 54 may be wetted generally evenly by applying liquid (e.g., cleaning solution) to one section and allowing the liquid to pass through the layer 46 over time to the other section. The two sections 50, 54 remain wet, and provide roughly the same coverage rates when used on a floor without one section drying up substantially more quickly than the other section.

To achieve limited liquid flow between sections 50, 54 of the mop 30, an exemplary layer 46 is at least 20% less liquid permeable than at least one of the layers immediately adjacent the layer 46 (e.g., at least one of the middle layers 38, 42 if such layers exist, or the top and/or bottom layers 32, 34 if either or both the layers 38, 42 do not exist). In other constructions, the layer 46 is at least 50% less liquid permeable than at least one of the layers immediately adjacent the layer 46. In still other constructions, the layer 46 is at least 70% less liquid permeable than at least one of the layers immediately adjacent the layer 46. By way of example, and with reference to the illustrated construction, the layer 46 is at least 20% less liquid permeable than the middle layers 38, 42 in some constructions, at least 50% less liquid permeable than the middle layers 38, 42 in other constructions, and at least 70% less liquid permeable than the middle layers 38, 42 in still other constructions. While permeability is described in terms of liters/minute above, permeability of the layer 46, and the other layers 32, 34, 38, 42 of the mop 30 may also be measured in square meters or Darcy units.

With continued reference to FIGS. 1-5, the layer 46 also facilitates wetting of a plurality of mops 30 at the same time. For example, when a plurality of mops 30 are stacked in a box or other receptacle, and liquid (e.g., cleaning solution) is poured over the stack of mops 30, the layers 46 permit the liquid to pass through the stack of mops 30 to wet each section 50, 54 of each mop 30 (and in some cases, to equally or substantially equally wet each section 50, 54). The layers 46 thus reduce the amount of time and effort required to separately wet each section 50, 54.

The layer 46 also provides humidity control in both sections 50, 54 of the mop 30. The humidity levels in the first and second sections 50, 54 are controlled by varying the selected permeability of the layer 46 (i.e., choosing a material with a desired liquid permeability). The greater the liquid permeability of the layer 46, the more quickly the humidity level in both sections 50, 54 approach a common level. Thus, if it is desired to have generally equal humidity levels in each of the sections 50, 54, a layer 46 with higher permeability is provided. In contrast, if it is desired to maintain one of the two sections 50, 54 at a higher humidity level for a given period of time (i.e., to slow the movement of liquid between the two sections 50, 54), a layer 46 with lower permeability is provided.

In some constructions, and as described above, the layer 46 permits an equal amount of mopping coverage on both sides 58, 62 of the mop 30, or provides for a more even amount of mopping coverage on both sides 58, 62. Thus, regardless of whether the first side 58 or the second side 62 is used on a floor, the mop 30 can clean an equal area on the floor, or areas that are closer to equal than without the mop structure described herein.

When constructing the double-sided mop 30 embodying the invention, it was expected that the cleaning ability of the mop would be diminished and the friction increased, due to the added material and layers resulting in more bulk and more weight. However, from testing and experimentation, the inventors have found that the mop 30 actually provides equal or greater cleaning ability than a single-sided mop and does not suffer from anticipated friction problems. For example, as described above, the material in the top and bottom layers 32, 34 facilitates low friction despite the increase in mop weight, allowing the mop 30 to slide easily along a floor surface. The mop 30 thus permits an equal amount of mopping coverage on both sides 58, 62 with little friction, and also cleans a floor just as well as a single-sided mop. Moreover, the double-sided mop 30 works better in cleaning a surface, applying fluid to the surface, and moving over the surface than a mop formed of two single mops placed in back-to-back relationship.

While the illustrated construction includes a semi-permeable layer 46, in other constructions the layer 46 can be non-permeable. In these constructions, both sections 50, 54 are wetted separately, since the non-permeable layer 46 prevents liquid transfer between the first and second sections 50, 54. The non-permeable layer 46 in these constructions separates the sections 50, 54, so that if desired one of the sections 50, 54 can remain dry while the other of the sections 50, 54 is wetted, or one of the sections 50, 54 is wetted with a first liquid, while the other of the sections 50, 54 is wetted with a second, different liquid. To wet both sections, full immersion with wringing, for example, may be used.

With reference to FIG. 2, along with having the front edge 73, the mop 30 also includes a back edge 136, and two side edges 138. The illustrated mop 30 has an overall rectangular shape, as do each of the top layer 32, the bottom layer 34, the middle layers 38, 42, and the layer 46. As illustrated in FIG. 2, the mop 30 has an overall length 140, measured along the front and back edges 73, 136 of between approximately 505 mm to 515 mm, and a width 142 (measured along the side edges 138) of between approximately 145 mm and 155 mm, although other sized mops 30 are considered herein. Any other mop shape (and layer shape) is possible, such as round, oval, square, diamond, trapezoidal, and irregular shapes by way of example only.

The illustrated mop 30 is fully seamed around the edges 73, 138 and 136, such that the mop 30 includes no pockets or openings. The illustrated mop 30 includes seam lines 144 along the top layer 32, as well as seam lines (not shown) along the bottom layer 34. With reference to FIG. 3, the mop 30 has a thickness 146 measured across the plurality of layers 32, 34, 38, 42, 46 of between approximately 18 mm to 20 mm. Other constructions can include other lengths, widths, and thicknesses for the mop 30, as well as for each of the layers 32, 34, 38, 42, and 46.

As illustrated in FIG. 2, the mop 30 also includes a taped border 148 along the back edge 136 and side edges 138, but not the front edge 73, to provide different exterior cleaning surfaces for the mop 30. The taped border 148 also provides added structure and rigidity to the mop 30. In other constructions, the taped border 148 extends along other areas of the mop 30, such as along the front edge 73 of the mop in addition to or instead of along the back edge 136 and/or side edges 138. In some constructions, the mop 30 can be provided without the taped border 148.

Figure 17:
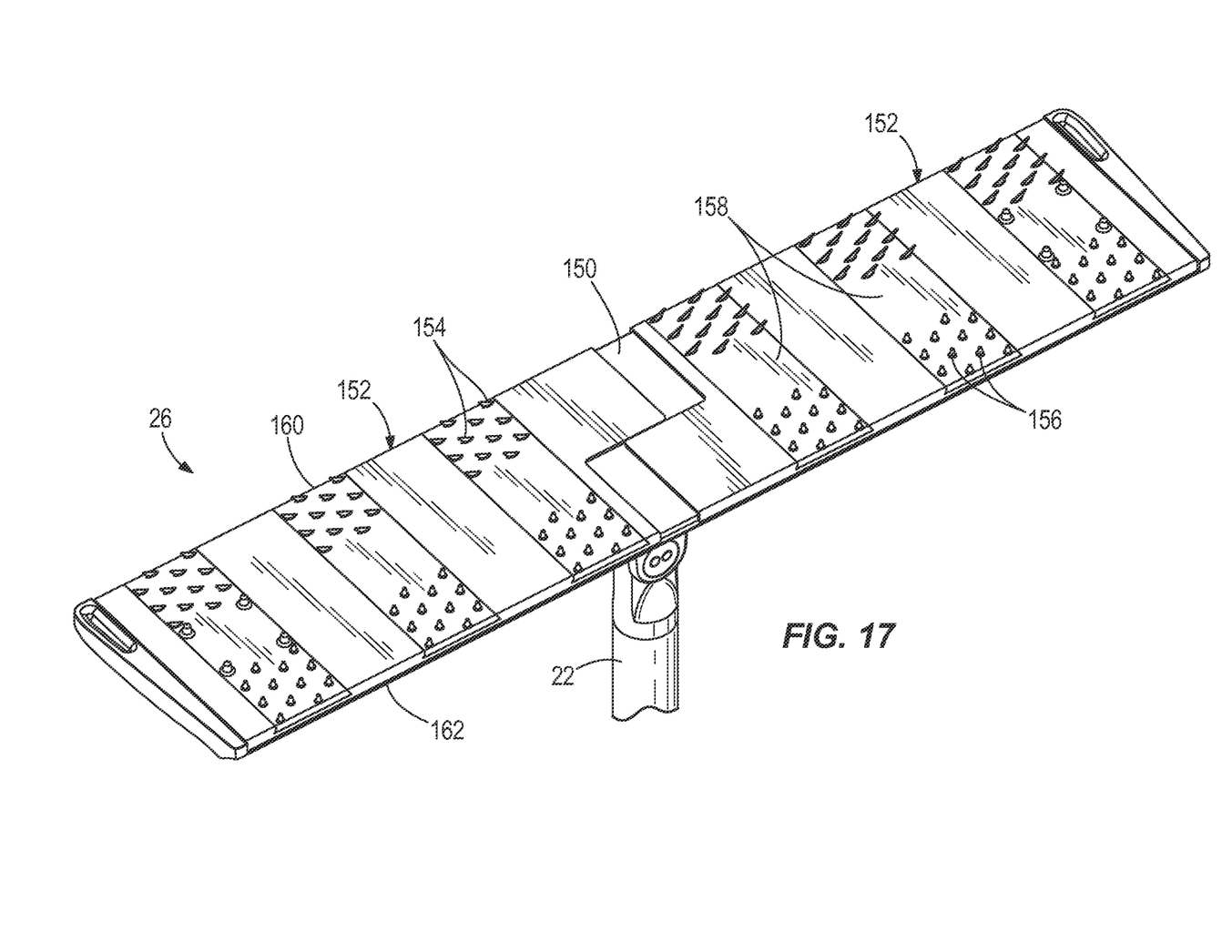
FIG. 17 is a perspective view of an underside of the tool head of FIG. 1 illustrating two mop engagement panels.
Figure 18:
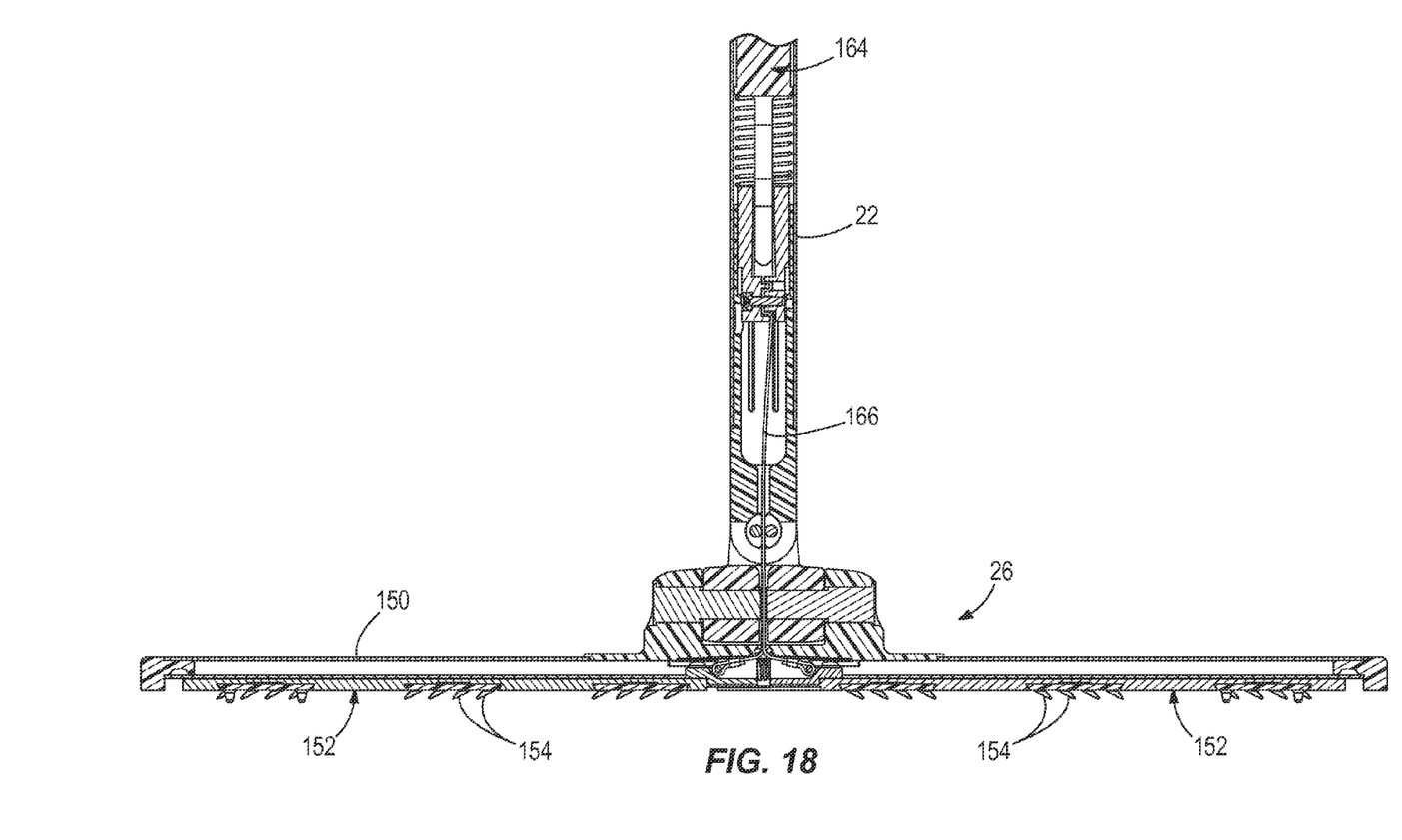
FIG. 18 is a section view of the tool, illustrating the mop engagement panels of the tool head in a first position.
Figure 19:
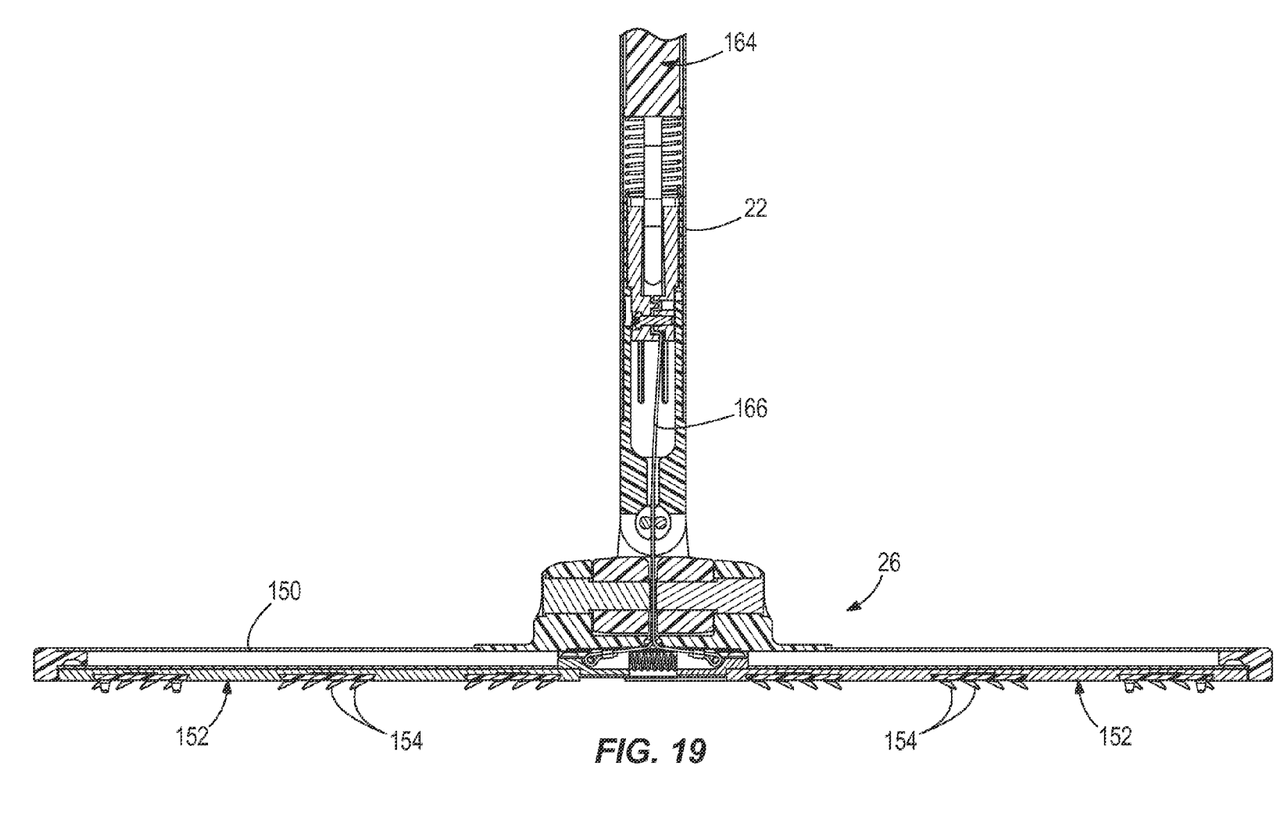
FIG. 19 is a section view of the tool, illustrating the mop engagement panels of the tool head in a second position.

With reference to FIGS. 17-19, a tool head 26 can be used in conjunction with the mop 30. The tool head 26 includes a frame 150 and engagement panels 152 slidably coupled to the frame 150. Sliding pins 154, 156 (e.g., cylindrical projections, tapered projections such as barbs, hooks, spurs, etc.) are positioned on the engagement panels 152 along engagement areas 158 of the panels 152. The pins 154, 156 facilitate attachment and detachment of the mop 30 relative to the tool head 26. In some constructions, such as in the illustrated construction, the tool head 26 has angled sliding pins 154 located adjacent a first edge 160 of the panels 152, and straight pins 156 located adjacent a second edge 162 of the panels 152 opposite the first edge 160. The angled sliding pins 154, 156 pickup and release the mop 30, while the straight pins 156 stretch the mop 30 substantially flat across the tool head to provide even and consistent contact between the mop 30 and a surface on which the tool 10 will be used.

With reference to FIGS. 1, 18, and 19, the tool 10 also includes a tool release mechanism 164 that is positioned between the handle 14 and the tool head 26 to attach and detach the mop 30 relative to the tool head 26. The tool release mechanism 164 is coupled to a cable assembly 166, and the cable assembly 166 is coupled to the panels 152. Activation of the tool release mechanism 164 causes movement of the cable assembly 166, which causes movement of the panels 152 either toward one another or away from one another. FIG. 18 illustrates a first condition in which the tool release mechanism 164 is used to pull the panels 152 toward one another (i.e. to release the mop 30). FIG. 19 illustrates a condition in which the tool release mechanism 164 is used to move the panels 152 away from one another (i.e. to engage the mop 30). In alternate constructions, only a single sliding panel 152 is used, in which case pins 154 or 156 can be located on one or more portions of the frame 150 as well as on the single sliding panel 152. Also, in some alternate embodiments, the sliding panels 152 are arranged to slide in a forward and rearward direction on the tool head, rather than laterally as shown in the illustrated embodiment. In other constructions, the mop 30 can be attached and detached relative to the tool 10 (or another tool) with other mechanisms besides those illustrated in FIG. 17-19.

Various features and advantages of the invention are set forth in the following claims.

The invention claimed is:

1. A mop comprising:
   a first section having a first exterior side engageable with a surface, the first section including a first outer layer and a first middle layer;
   a second section on a reverse side of the mop and having a second exterior side engageable with the surface, the second section including a second outer layer and a second middle layer; and
   an embedded semi-permeable mesh layer disposed between the first and second sections to limit permeability of liquid flowing from the first side to the second side;
   wherein the first middle layer is disposed between the first outer layer and the semi-permeable layer,
   wherein the second middle layer is disposed between the second outer layer and the semi-permeable layer, and
   wherein each of the first middle layer and the second middle layer defines a reservoir configured to receive, retain, and discharge liquid received by the mop.

2. The mop of claim 1, wherein the semi-permeable layer is at least 50% less liquid permeable than that of mop material immediately adjacent the semi-permeable layer.

3. The mop of claim 1, wherein the semi-permeable layer is at least 70% less liquid permeable than that of mop material immediately adjacent the semi-permeable layer.

4. The mop of claim 1, wherein one or both of the first and second outer layers forms a front edge, a back edge, and two side edges of the mop, and wherein the mop is fully seamed along the front edge, the back edge, and the two side edges.

5. The mop of claim 1, wherein the first outer layer and the second outer layer are defined by a continuous layer of material that wraps around the first middle layer, the second middle layer, and the semi-permeable layer.

6. The mop of claim 1, wherein the first outer layer and the second outer layer are formed of a low-friction material.

7. A mop comprising:
   a plurality of layers including an embedded, semi-permeable mesh layer that limits liquid transfer from a first side of the mop having a first outer layer and a first middle layer to a second side of the mop having a second outer layer and a second middle layer for controlled wetting of sides of the mop, wherein the embedded semi-permeable layer is substantially non-absorbent;
   wherein the first middle layer is disposed between the first outer layer and the semi-permeable layer,
   wherein the second middle layer is disposed between the second outer layer and the semi-permeable layer, and
   wherein each of the first middle layer and the second middle layer defines a reservoir configured to receive, retain, and discharge liquid received by the mop.

8. The mop of claim 7, further including a taped border extending along a portion of the mop.

9. The mop of claim 8, wherein the plurality of layers form a front edge, a back edge, and two side edges of the mop, and wherein the mop is fully seamed along the front edge, the back edge, and the two side edges.

10. The mop of claim 7, wherein the semi-permeable layer is made of warp knit polyester 150/48 FY and polyester 75/36 FY.

11. The mop of claim 7, wherein the first outer layer and the second outer layer are defined by a continuous layer of material that wraps around the first middle layer, the second middle layer, and the semi-permeable layer.

12. The mop of claim 7, wherein the first outer layer and the second outer layer are formed of a low-friction material.

13. A floor tool comprising:
   a handle;
   a tool head coupled the handle, the tool head including an engagement panel disposed along a bottom of the tool head, the engagement panel including engagement members and movable between a first position and a second position;
   a tool release mechanism operably coupled to the engagement panel to move the engagement panel between the first position and the second position; and
   a mop releasably coupled to the tool head via the engagement members, the mop including an embedded semi-permeable mesh layer that divides the mop into two sections to limit an amount of liquid flowing from a first side of the mop having a first outer layer and a first middle layer to a second side of the mop having a second outer layer and a second middle layer;
   wherein the first middle layer is disposed between the first outer layer and the semi-permeable layer,
   wherein the second middle layer is disposed between the second outer layer and the semi-permeable layer, and
   wherein each of the first middle layer and the second middle layer defines a reservoir configured to receive, retain, and discharge liquid received by the mop.

14. The floor tool of claim 13, wherein the first side of the mop defines a top outer surface and the second side of the mop defines a bottom outer surface.

15. The floor tool of claim 13, wherein the first side is formed of a first material and the second side is formed of a second, different material.

16. The floor tool of claim 13, wherein one or both of the first and second outer layers forms a front edge, a back edge, and two side edges of the mop, and wherein the mop is fully seamed along the front edge, the back edge, and the two side edges.

17. The floor tool of claim 13, wherein the first outer layer and the second outer layer are defined by a continuous layer of material that wraps around the first middle layer, the second middle layer, and the semi-permeable layer.

\* \* \* \* \*